No. 886,055.
PATENTED APR. 28, 1908.
A. A. HILLBACK.
POWER MITER SAW.
APPLICATION FILED OCT. 18, 1907.
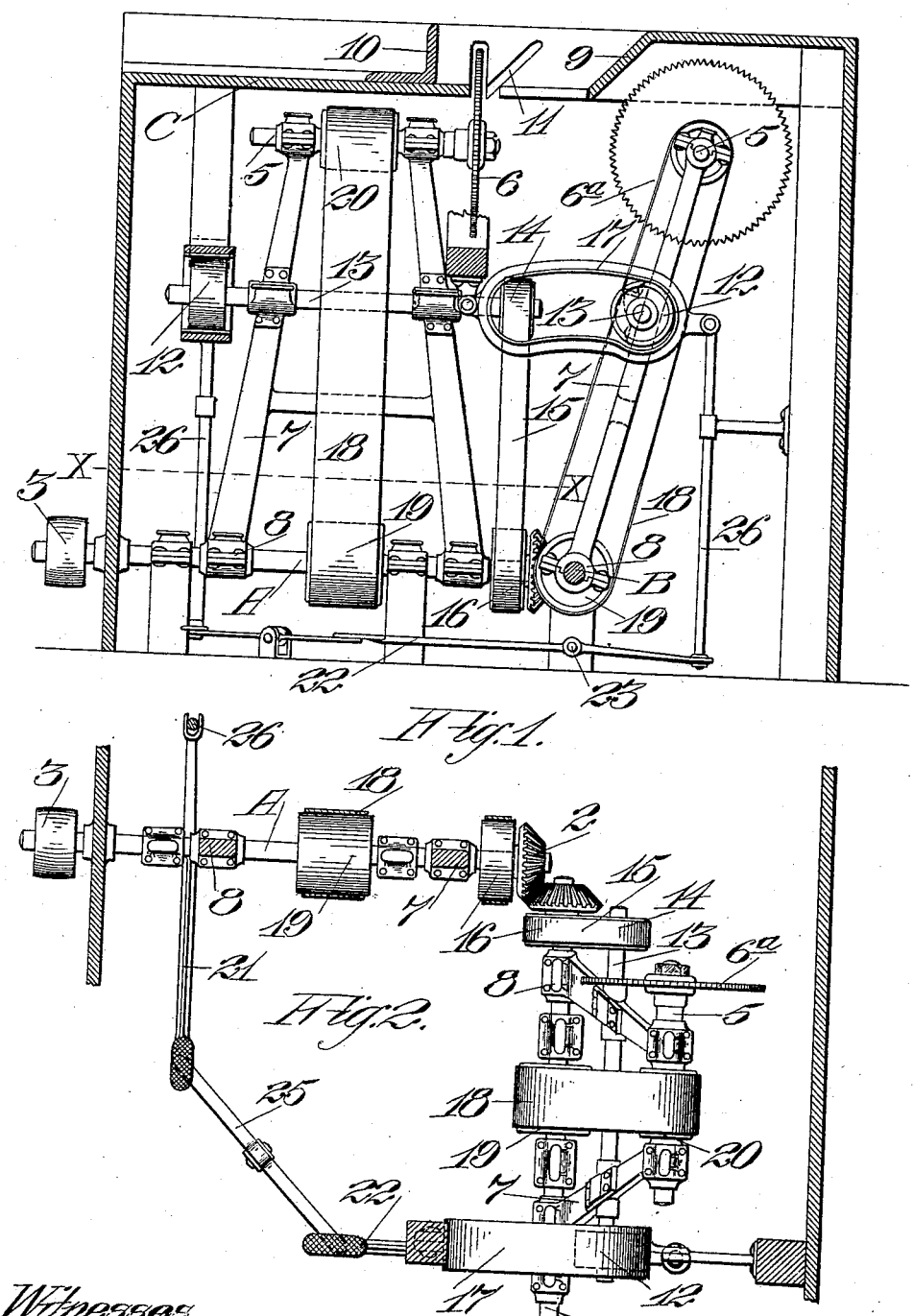

UNITED STATES PATENT OFFICE.

ANDREW A. HILLBACK, OF SAN FRANCISCO, CALIFORNIA.

POWER MITER-SAW.

No. 886,055.  Specification of Letters Patent.  Patented April 28, 1908.

Application filed October 18, 1907. Serial No. 398,058.

*To all whom it may concern:*

Be it known that I, ANDREW A. HILLBACK, a citizen of United States, residing in the city and county of San Francisco and State of California, have invented new and useful Improvements in Power Miter-Saws, of which the following is a specification.

My invention relates to an improvement in apparatus which is designed for cutting miters.

It consists in the combination of parts and in details of construction, which will be more fully explained by reference to the accompanying drawings, in which—

Figure 1 is a side elevation of my invention. Fig. 2 is a plan view, of which one-half is shown on line X—X of Fig. 1.

It is the object of my invention to provide an apparatus for conveniently and accurately cutting miters, and particularly for cutting such miters for picture and other frames which it is desirable to have accurately joined together. Saws suspended and capable of being swung backward and forward have been employed for this and similar purposes, but such saws have usually been operated by hand, and an operator using such a saw would be unable to hold the work so as to make accurate cuts.

In my invention, I have shown power operated saws, and pedal device by which the saw mountings are frictionally engaged so as to be caused to travel across the work and cut the miters successively, the operator meantime having the free use of both hands to accurately hold the work in position.

As herein shown, A and B are two shafts journaled at right angles with each other, their axes intersecting at a point beneath the work-table, or other equivalent table C. These shafts are provided with miter gears 2, so that power applied through a pulley 3 upon the end of one of the shafts will revolve both shafts simultaneously and in unison.

5 are saw arbors journaled parallel with the shafts A and B, respectively, and having the saws 6—6ᵃ carried upon the inner ends of the arbors. These saw arbors are journaled upon frames 7 having boxes 8 from which they are supported upon the shafts A and B, respectively; and these frames extend upward so that the saws are normally carried within housings 9 upon the top of the work-table, and are thus out of the way, and the operator will be free from any danger. The front of the housing has diagonal slots made in it, as at 11, and either of the saws may be moved forward through its slots by the swing of the saw frame about the power shafts A and B. These frames may be so mounted that they will normally incline rearwardly from the vertical plane of the shafts, and will thus be held in their retracted position by gravitation; but it will be manifest that they may also be drawn into and retained in this position either by springs or by being mechanically actuated from the shafts, or other movable parts of the apparatus. Suitable guides 10 are fixed upon the work-table, against which the frames or strips to be sawed can be held by the operator.

For the purpose of advancing the saws, when required, I have shown rollers 12 fixed upon shafts 13 which are here shown journaled upon the saw frames 7 parallel with and between the shafts A and B and the saw arbors. Upon the inner ends of these shafts 13 are belt pulleys 14, and belts 15 pass around these pulleys and coacting pulleys 16 which are fixed upon the shafts A and B contiguous to the miter gears 2, previously described, so that the revolutions of the shafts A and B communicate power through the belt to drive the shafts 13 and the rollers 12. These rollers are designed to advance and retract the saws, and for this purpose the rollers revolve within slotted frames 17. The slots in these frames 17 have a radius of curvature of which the shafts A and B are the centers; and the rollers 12 are so located that by the proper movement of these slotted frames, the rollers may be brought into contact either with the bottom or the top of the slots. Thus, the rollers revolved by the connections previously described, if either slotted frame is lifted so that the roller comes in contact with the bottom of the slot, the friction will cause the roller to advance toward the front end of the slot; and in its advance it carries with it the saw frame and the saw, thus causing the saw to move across the article to be mitered, and to cut it, the saw being continuously revolved by a belt 18 passing around pulleys 19 and 20 upon the shaft A or B, and the saw arbor to which it appertains. When the roller 12 is raised so as to contact with the upper part of the curved slot in which it travels, it will reverse the movement of the frame, and thus carry the saw frame and the parts carried by it, to the rear, and retract the saw again within its housing. In order to control the operations of this mechanism, I have shown foot-levers 21 and 22 conveniently fulcrumed, as at 23, and having the ends of the long arms contiguous to each other and within easy reach of the operator, so that the foot may be placed upon either of these levers, and thus advance the saw controlled by that lever. For convenience, I have shown a tilting lever 25 fulcrumed between the contiguous ends of the levers 21 and 22, so that by pressing upon either end of the lever 25, the lever controlled thereby may be depressed, and the other one either released or raised. The outer or short ends of the levers 21 and 22 are connected by rods 26 with the inner ends of the slotted frames 17, within which the rollers 12 turn. The opposite ends of these slotted frames being fulcrumed, or held in position, it will be manifest that when the movable ends of the frames are lifted by the action of the foot-levers and the connecting rods 26, the bottom of the slots will be brought into contact with the rollers 12, with the result of causing the rollers to advance and carry the saws with them, as previously described; and when the foot-lever is released, the slotted frame will drop by gravitation, or by spring pressure if desired, so that the upper part of the curved slot will come in contact with the roller, and the roller will thus be carried back to the rear end of the slot, taking with it the saw frame, as before described. It will be manifest, however, that the retraction of the saw frame might be effected by a spring or weight sufficiently powerful for that purpose, but which would be overcome by the frictional pressure of the roller 12 upon the bottom of the slot when it was desired to advance the saw.

Having thus described my invention, what I claim and desire to secure by Letters Patent is—

1. An apparatus for sawing miters, said apparatus including power shafts journaled at right angles, frames supported upon and movable transversely of said shafts, saws having their arbors journaled upon said frames, means whereby power is transmitted from the main shafts to the saw arbors, a table adapted to support the work and having channels in the line of movement of the saws, and means by which the saws may be moved forward and back in the slots of the table, said last-named means comprising fixed arcs arranged concentric with the power shafts, and driven-rollers mounted on the saw-frames and adapted to travel over said arcs.

2. An apparatus for sawing miters, said apparatus including a table and guides upon which the parts to be mitered are carried, power shafts journaled at right angles in the lower part and having bevel gears whereby they are revoluble in unison, frames having their lower ends loosely supported upon the shafts, saw carrying arbors journaled at the upper ends of the frames with the saws projecting above the table, belts whereby motion is transmitted from the main shafts to the saw arbors, other shafts journaled upon said frames, having rollers at one end, and pulleys and belts whereby said shafts and rollers are revolved in unison with the revolution of the power shafts, and surfaces with means by which they are brought in contact with the rollers, whereby the latter roll upon said surfaces and advance the saw frames and saws across the table.

3. In an apparatus of the character described, a table or support, power shafts journaled at right angles across the lower part, means by which said shafts are revolved in unison, frames having their lower ends supported by boxes in which the power shafts are turnable, saws mounted upon arbors journaled in the upper part of the frame and parallel with the power shaft, pulleys and belts by which power is transmitted from the power shafts to drive the saws, rollers fixed upon shafts journaled across said frames, and belts and pulleys by which the shafts and rollers are revolved, frictional contact surfaces, foot-levers and connecting rods whereby said contact surfaces are pressed against the rollers so that the latter are caused to advance upon said surfaces, whereby the saws are moved across the table.

4. In an apparatus of the character described, a work-table having a housing in the rear portion and guides upon the front portion, said table and housing being slotted diagonally, power shafts journaled at right angles, and miter gears by which the shafts are revolved in unison, saw-carrying frames mounted and tiltable upon said shafts, belts and pulleys whereby motion is transmitted from the shafts to the saw arbors, roller-carrying shafts journaled upon the saw frames parallel with the power shafts and saw arbors, frictional surfaces having one end fulcrumed to supports, foot-levers and rods connecting with the opposite end of said surfaces, whereby the surfaces may be alternately raised into contact with the rollers, and the saws caused to swing forward within the table slots and across the work-supporting guides.

5. In an apparatus of the character described, a work-table having a housing in the rear portion and guides upon the front portion, said table and housing being slotted diagonally, power shafts journaled at right angles, and miter gears by which the shafts are revolved in unison, saw-carrying frames mounted and tiltable upon said shafts, belts and pulleys whereby motion is transmitted from the shafts to the saw arbors, roller-carrying shafts journaled upon the saw frames parallel with the power shafts and saw arbors, frames having curved slots, with the power shafts as their radii, and within which slots the rollers are turnable, foot-levers and connecting rods whereby said slotted frames may be raised to bring the lower part of the rollers into contact with the bottom of the slot and advance the saws across the table, or depressed to bring the upper part of the rollers into contact with the upper part of the slot, to return the saws to their normal position.

6. In an apparatus of the character described, saws and saw arbors, frames upon which the arbors are journaled, power shafts journaled at right angles with each other and revoluble in unison, journals upon the shafts about which the saw frames are turnable with the shafts as centers of motion, rollers, the shafts of which are turnable upon the saw frames parallel with the power shafts and saw arbors, fixed frictional surfaces forming arcs concentric with the power shafts, and means to force the rollers into contact with, and to travel upon said surfaces, and to carry the saws in diagonal planes across the table.

In testimony whereof I have hereunto set my hand in presence of two subscribing witnesses.

ANDREW A. HILLBACK.

Witnesses:
 ELMER E. PARLIN,
 HENRY SHULTZ.